US008849958B2

(12) United States Patent
Liebald et al.

(10) Patent No.: US 8,849,958 B2
(45) Date of Patent: Sep. 30, 2014

(54) PERSONAL CONTENT STREAMS BASED ON USER-TOPIC PROFILES

(75) Inventors: Benjamin Liebald, San Francisco, CA (US); Palash Nandy, Paris (FR); Dasarathi Sampath, San Bruno, CA (US); Ye Niu, San Bruno, CA (US); Jamie Davidson, San Francisco, CA (US); Christina Ilvento, San Francisco, CA (US); Patrick Hung, San Bruno, CA (US)

(73) Assignee: Google Inc., Mountain View, CA (US)

( * ) Notice: Subject to any disclaimer, the term of this patent is extended or adjusted under 35 U.S.C. 154(b) by 143 days.

(21) Appl. No.: 13/309,501

(22) Filed: Dec. 1, 2011

(65) Prior Publication Data

US 2012/0143996 A1 Jun. 7, 2012

Related U.S. Application Data (60) Provisional application No. 61/418,818, filed on Dec. 1, 2010.

(51) Int. Cl.
*G06F 15/16* (2006.01)
*G06F 17/30* (2006.01)
(52) U.S. Cl.
CPC ................ *G06F 17/30702* (2013.01)
USPC ........... 709/219; 709/217; 709/218; 709/230; 709/231
(58) Field of Classification Search
USPC .................. 709/217–219, 230, 231
See application file for complete search history.

(56) References Cited

U.S. PATENT DOCUMENTS

| 6,513,039 B1 | 1/2003 | Kraenzel |
| 7,313,621 B2 | 12/2007 | Gudorf et al. |
| 7,596,591 B2 | 9/2009 | Titmuss |
| 7,707,167 B2 | 4/2010 | Kishore et al. |
| 7,813,954 B1 | 10/2010 | Price et al. |
| 7,827,170 B1 | 11/2010 | Horling et al. |
| 7,970,762 B2 | 6/2011 | Goronzy et al. |
| 8,019,777 B2 | 9/2011 | Hauser |
| 8,037,095 B2 | 10/2011 | Haileselassie et al. |
| 8,161,044 B2 | 4/2012 | Blackwell et al. |

(Continued)

FOREIGN PATENT DOCUMENTS

KR   10-2009-0013155 A   2/2009

OTHER PUBLICATIONS

PCT International Search Report and Written Opinion, PCT Application No. PCT/US2011/062965, Jul. 27, 2012, 8 pages.

(Continued)

*Primary Examiner* — Wing F Chan
*Assistant Examiner* — Padma Mundur
(74) *Attorney, Agent, or Firm* — Fenwick & West LLP (57) ABSTRACT

A personal content stream comprising a plurality of videos is generated for a user. The user selects topics used in the generation of a personal content stream. The plurality of user selected topics is expanded to include topics related to one or more of the user selected topics. Each of the topics in the expanded plurality of topics includes a topic weight. Videos are selected that are related to one or more of the expanded plurality of topics to generate a plurality of stream videos. Additional videos are selected and added to the plurality of stream videos as the user watches videos. The topic weights are adjusted during video playback based on feedback from the user.

13 Claims, 8 Drawing Sheets

(56) References Cited

U.S. PATENT DOCUMENTS

| | | | |
|---|---|---|---|
| 8,171,032 | B2 | 5/2012 | Herz |
| 8,180,776 | B2 | 5/2012 | Haveliwala et al. |
| 8,196,166 | B2 | 6/2012 | Roberts et al. |
| 8,306,975 | B1 * | 11/2012 | Eldering .................. 707/732 |
| 8,543,649 | B2 | 9/2013 | Gilmour et al. |
| 2002/0015056 | A1 | 2/2002 | Weinlaender |
| 2002/0055936 | A1 | 5/2002 | Cheng et al. |
| 2003/0037041 | A1 | 2/2003 | Hertz |
| 2003/0093794 | A1 | 5/2003 | Thomas et al. |
| 2003/0154180 | A1 | 8/2003 | Case et al. |
| 2003/0170006 | A1 * | 9/2003 | Bogda et al. .................... 386/96 |
| 2004/0059705 | A1 | 3/2004 | Wittke et al. |
| 2004/0098386 | A1 | 5/2004 | Thint et al. |
| 2004/0098469 | A1 | 5/2004 | Kindo et al. |
| 2005/0216434 | A1 | 9/2005 | Haveliwala et al. |
| 2006/0161553 | A1 | 7/2006 | Woo |
| 2006/0161952 | A1 | 7/2006 | Herz et al. |
| 2007/0028266 | A1 | 2/2007 | Trajkovic et al. |
| 2007/0294721 | A1 * | 12/2007 | Haeuser et al. ................. 725/34 |
| 2008/0027979 | A1 | 1/2008 | Chandrasekar et al. |
| 2008/0163071 | A1 * | 7/2008 | Abbott et al. ................. 715/748 |
| 2008/0208852 | A1 | 8/2008 | Kuttikkad et al. |
| 2009/0019062 | A1 | 1/2009 | Saba |
| 2009/0144654 | A1 | 6/2009 | Brouwer et al. |
| 2009/0198701 | A1 | 8/2009 | Haileselassie et al. |
| 2009/0234878 | A1 | 9/2009 | Herz et al. |
| 2009/0254563 | A1 | 10/2009 | Arnold et al. |
| 2009/0282034 | A1 | 11/2009 | Goronzy et al. |
| 2010/0023506 | A1 | 1/2010 | Sahni et al. |
| 2010/0082660 | A1 | 4/2010 | Muilenburg et al. |
| 2010/0146553 | A1 | 6/2010 | Lo et al. |
| 2010/0153318 | A1 * | 6/2010 | Branavan et al. ............... 706/12 |
| 2010/0211568 | A1 | 8/2010 | Chu et al. |
| 2010/0293057 | A1 | 11/2010 | Haveliwala et al. |
| 2011/0015991 | A1 | 1/2011 | Fayyad et al. |
| 2011/0029515 | A1 | 2/2011 | Scholz et al. |
| 2011/0087773 | A1 | 4/2011 | Ishioka |
| 2011/0099263 | A1 | 4/2011 | Patil et al. |
| 2011/0153638 | A1 * | 6/2011 | McLean ....................... 707/769 |
| 2011/0295612 | A1 | 12/2011 | Donneau-Golencer et al. |
| 2012/0066212 | A1 | 3/2012 | Jennings |
| 2012/0079385 | A1 | 3/2012 | Ellis et al. |
| 2012/0102121 | A1 | 4/2012 | Wu et al. |
| 2013/0080526 | A1 | 3/2013 | Gill et al. |
| 2013/0218905 | A1 | 8/2013 | Sankarasubramaniam et al. |

OTHER PUBLICATIONS

PCT International Search Report and Written Opinion, PCT Application No. PCT/US2011/062956, Jul. 27, 2012, 9 pages.

U.S. Appl. No. 13/309,507, Application as filed on Dec. 1, 2011, 52 Pages (Copy Not Enclosed).

* cited by examiner

PERSONAL CONTENT STREAMS BASED ON USER-TOPIC PROFILES

CROSS-REFERENCE TO RELATED APPLICATION

This application claims the benefit of U.S. Provisional Application No. 61/418,818 filed Dec. 1, 2010, which is hereby incorporated by reference in its entirety.

BACKGROUND

1. Field of Disclosure

The disclosure generally relates to creating and storing user profiles based on content consumption.

2. Description of the Related Art

Content hosting services generally attempt to present content that is generally of interest to its users. Most services present such content in various predefined categories, such as sports, music, automotive, comedy, animation, and so forth. Content, whether user generated or from third parties, is placed into these predefined categories using either manual or automated methods. However, users' interests may not correspond to the predefined categories, thus making it more difficult for users to find content in which they are interested.

SUMMARY

A personal content stream comprising a plurality of videos is generated for a user. The user selects topics used in the generation of a personal content stream. The plurality of user selected topics is expanded to include topics related to one or more of the user selected topics. Each of the topics in the expanded plurality of topics includes a topic weight. Videos are selected that are related to one or more of the expanded plurality of topics to generate a plurality of stream videos. Additional videos are selected and added to the plurality of stream videos as the user watches videos. The topic weights may be adjusted during video playback based on feedback from the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables determination and storage of user profiles that represent, for each user, a set of topics indicative of the user's interests, based on the user's interaction with content items. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
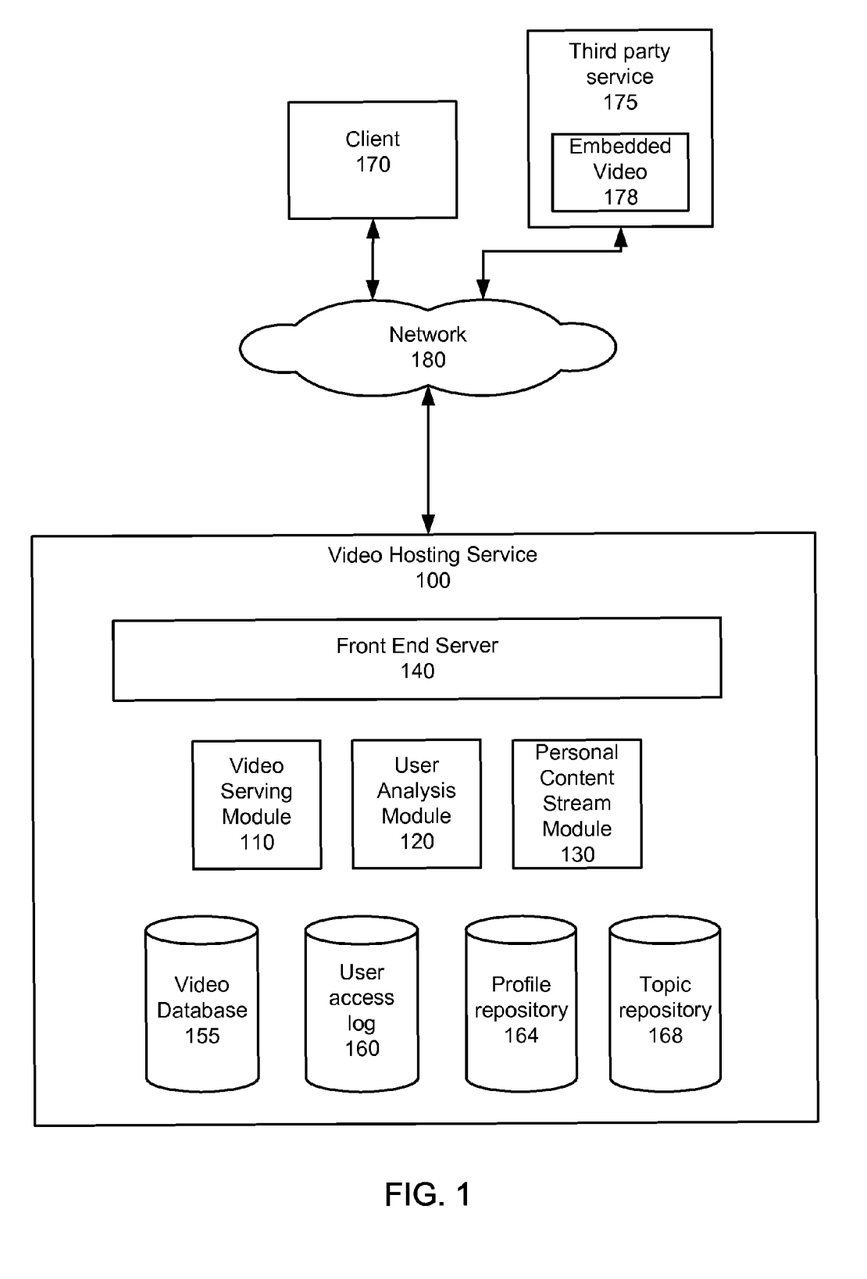
FIG. 1 illustrates a system for determining and storing the users' profile including their areas of interest according to one embodiment.

FIG. 1 illustrates a system for determining and storing user profiles. A video hosting service 100 includes a front end web server 140, a video serving module 110, a video database 155, a user analysis module 120, a user access log 160, a profile repository 164 and a topic repository 168. Video hosting service 100 is connected to a network 180. FIG. 1 also includes a client 170 and third-party service 175 having an embedded video 178.

Many conventional features, such as firewalls, load balancers, application servers, failover servers, network management tools and so forth are not shown so as not to obscure the features of the system. A suitable service for implementation of the system is the YOUTUBE™ service, found at www.youtube.com; other video hosting services are known as well, and can be adapted to operate according to the teaching disclosed here. The term "service" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The servers and modules described herein are implemented as computer programs executing on server-class computer comprising a CPU, memory, network interface, peripheral interfaces, and other well known components. The computers themselves in some embodiments run a conventional proprietary or open-source operating system such as Microsoft Windows, Mac OS, Linux, etc., have generally high performance CPUs, gigabytes or more of memory, and gigabytes, terabytes, or more of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage mediums (e.g., RAM, hard disk, or optical/magnetic media).

A client 170 connect to the front end server 140 via network 180, which is typically the internet, but can also be any network, including but not limited to any combination of a LAN, a MAN, a WAN, a mobile, wired or wireless network, a private network, or a virtual private network. While only a single client 170 is shown, it is understood that very large numbers (e.g., millions) of clients can be supported and can be in communication with the video hosting service 100 at any time. The client 170 may include a variety of different computing devices. Examples of client devices 170 are personal computers, digital assistants, personal digital assistants, cellular phones, mobile phones, smart phones or laptop computers. As will be clear to one of ordinary skill in the art, the present invention is not limited to the devices listed above.

The client includes a browser or a dedicated application that allows client 170 to present content provided on the video hosting service 100. Suitable applications include, for example, Microsoft Internet Explorer, Netscape Navigator, Mozilla Firefox, Apple Safari, and Google Chrome. The browser can also include or a support a plug-in for a video player (e.g., Flash™ from Adobe Systems, Inc.), or any other player adapted for the video file formats used in the video hosting service 100. Alternatively, videos can be accessed by a standalone program separate from the browser.

The digital content items can include, for example, video, audio or a combination of video and audio. Alternatively, a digital content item may be a still image, such as a JPEG or GIF file or a text file. For purposes of convenience and the description of one embodiment, the digital content items will be referred to as a "video," "video files," or "video items," but no limitation on the type of digital content items are indented by this terminology. Other suitable types of digital content items include audio files (e.g. music, podcasts, audio books, and the like), documents, images, multimedia presentations, and so forth.

The video hosting service 100 provides videos that have been uploaded by other users of the video hosting service 100, or may have been provided by the video hosting service operator, or by third parties. Clients 170 can search for videos based on keywords or other metadata. These requests are received as queries by the front end server 140 and provided to the video serving module 110, which is responsible for searching the video database 155 for videos that satisfy the user queries and providing the videos to the users. The video serving module 110 supports searching on any fielded data for a video, including its title, description, metadata, author, category and so forth. Alternatively, users can browse a list of videos based on categories such as most viewed videos, sports, animals, or automobiles. For example, the user may browse a list of videos related to cars and select which videos from the list to view.

Video database 155 stores videos provided to clients 170. Each video in one embodiment has a video identifier (id). Each video file has associated metadata associated that includes video ID, author, title, description, and keywords, additional metadata can be included as available. The metadata also includes one or more topics that are associated with the video. The associated topics may include topics created by a community in a collaborative knowledge base like Freebase. Alternatively, the topics may be selected from the frequently occurring topics occurring in the titles, descriptions, and user comments of the videos, for example the 100,000 most frequently occurring term unigrams or bigrams. The topics are stored in a topic repository 168.

In one embodiment, each topic is associated with a topic strength TS representing the topics' degree of association with the video. The topic strength for a particular topic and video is based on content analysis of the video, users' comments for the video, or other metadata associated with the video. Alternatively, instead of being stored with the metadata of each video, the topics and topic strength information can be stored in a separate database.

In one embodiment, the topic strength for a video is also adjusted based on the usefulness of a topic. The usefulness of a topic is a weight reflecting how useful is a topic to a system in representing the topic's association with the video. For example, the system operator may not prefer topics that represent racy or objectionable content and therefore the usefulness weight for such topics may be a low or a negative value. In another example, the usefulness of a topic is based on the frequency of topic in the corpus.

The user access log 160 stores access data describing the user's access and interactions with videos. The access data indicates whether a user watched an entire video, watched a video for a particular duration, skipped a video, scrolled up or down through a web page including a video, shared a video with other users, added a video to a playlist, flagged a video, blocked a video from a playlist or a collection of videos, favorited a video, gave a video a favorable rating (e.g. liked a video using a FACEBOOK™ account or +1'd a video using a GOOGLE+™ account), gave a video an unfavorable rating (e.g. "thumbs down"). In one embodiment, the user access log 160 or another entity associated with the user access log 160 provides the users with the opportunity to opt-out of having the users' access data collected and/or shared with other modules in the video hosting service 100 or other services.

The profile repository 164 stores the user profiles. A user profile includes a set of topics for a user. This set of topics represents the user's interest and the list may be partly populated by receiving a number of topics from the user. The user profile may include the topics as a list of topics (e.g., as terms or topic identifiers), or as vector (e.g., bit map, or vector of real valued weights). Additionally, the list is populated by the user analysis module 120. The topics stored in a user's profile can be used for various purposes. For example, the topics can be displayed as user's area of interest on the user's home page in a social network or a content hosting network. Additionally, the topics may be used to suggest to the user content, content channels, products, services, additional topics etc. that may be of interest to the user. The suggestions may be provided to the user on the user's home page or another web page like a "browse" page where a user may browse through various topics that may be of interest to the user.

In one embodiment, the topics displayed on the user's home page or browse page are selectable (for e.g. through a hyperlink). A user may select a topic and the selection leads the user to a web page partly or wholly dedicated to the selected topic. The selected topic's web page includes content related to the selected topic, like related multimedia content or textual content. Additionally, the topic's web page may include links to other related topics' web pages. These related topics may be displayed as topics related to the selected topic or recommended topics for a user visiting the selected topic's web page.

Figure 2:
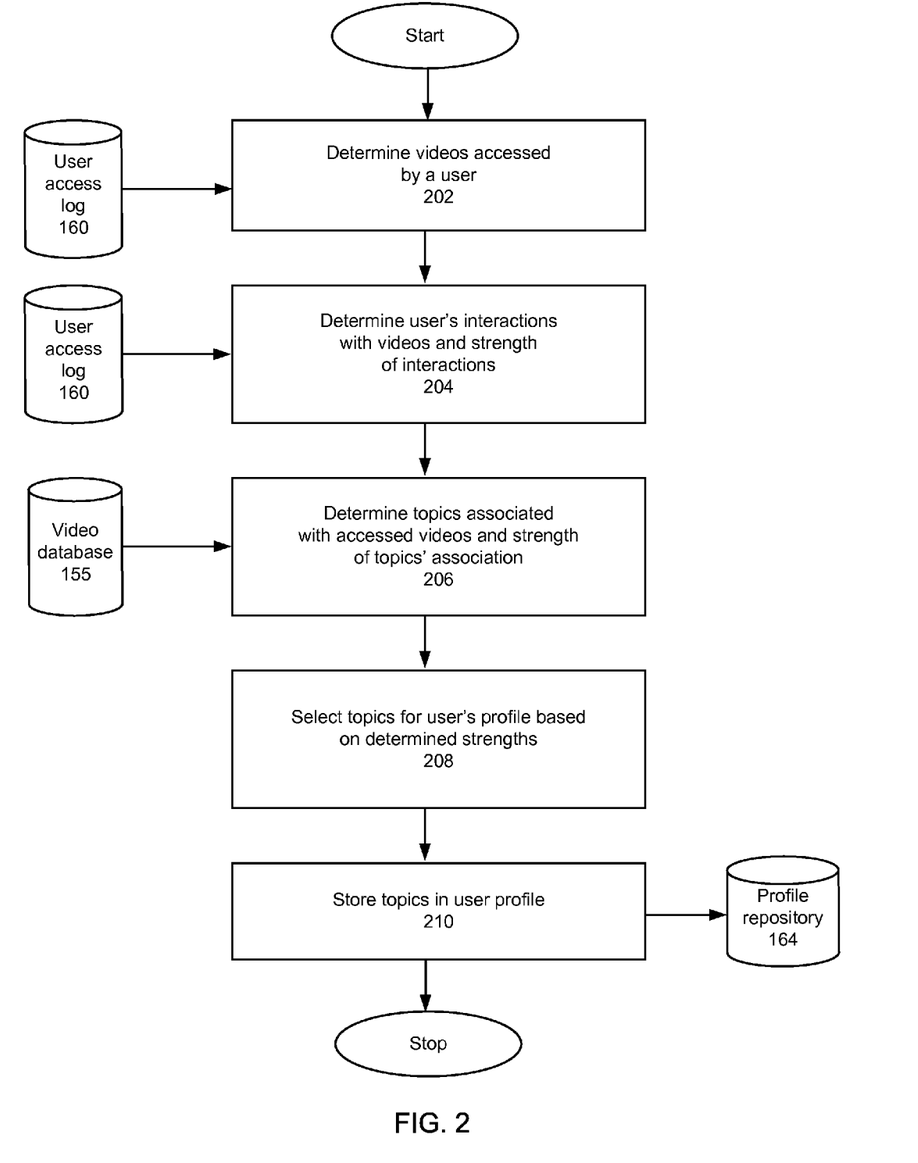
FIG. 2 is a flow diagram illustrating a method for determining and storing the users' profile including their areas of interest according to one embodiment.

The user analysis module 120 determines and stores a user profile based on the videos accessed by the user, and is one means for performing this function. FIG. 2 illustrates method executed by the user analysis module 120 for determining and storing the topics for a user profile. To determine the topics, the user analysis module 120 queries the user access log 160 and determines 202 videos accessed by the user. This set of videos can be all videos accessed by the user, or just those accessed by the user within a certain time period, such as the previous thirty days.

The user analysis module 120 analyzes the user's access data stored in the user access log 160 and determines 204 the user's interactions with the accessed videos. The user analysis module 120 also determines 204 the user's interaction strength for each accessed video based on factors like the type of user's interaction with the accessed video. The user analysis module 120 also queries the video database 155 and determines 206, for each video accessed by the user, the topics associated with the accessed videos and the video's topic strengths indicating the video's degree of association with the topics. Based on the determined interaction strengths and topic strengths, the user analysis module 120 selects 208 and stores 210 topics in the user's profile.

The personal content stream module 130 enables the user to select topics for use in generating a personal content stream. The set of user selected topics is expanded based on stored co-occurrence strengths to include additional topics. Each of the topics in the expanded set of topics includes a topic weight. Videos are selected for inclusion in the personal content stream that are related to one or more of the expanded set of topics to generate a set of stream videos. Additional videos are selected and added to the set of stream videos as the user watches videos. The topic weights may be adjusted during video playback based on feedback from the user. The personal content stream module 130 is further described below respect to FIGS. 6-8.

Figure 3:
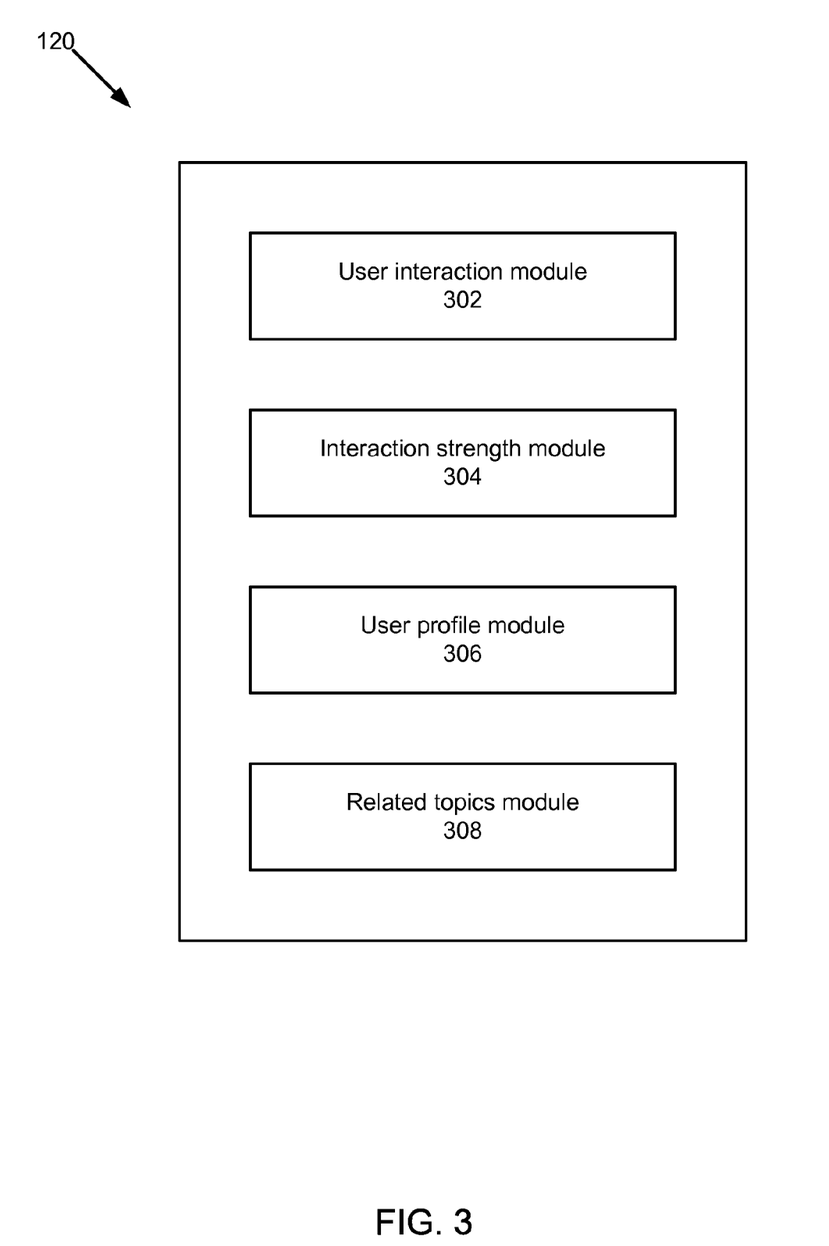
FIG. 3 is a block diagram illustrating the user analysis module that determines and stores the user profiles according to one embodiment.

FIG. 3 is a block diagram illustrating the user analysis module 120 according to one embodiment. The user analysis module 120 comprises a user interaction module 302, an interaction strength module 304, a user profile module 306 and a related topics module 308.

The user interaction module 302 receives feedback regarding the users' interactions with videos and stores the received feedback as access data in the user access log 160. A module (not shown) in the client 170 (or the service 175) tracks data about the user's interactions (e.g. pause, rewind, fast forward). Additional user's interactions (e.g. the user requesting a video, rating a video, sharing a video) are tracked by a module (not shown) in the video hosting service 100 or at another service like a social networking service. Regardless of where the data is tracked, the data is transmitted to the user interaction module 302. The user interaction module 302 receives the transmitted data and stores the received data in the user access log 160 as access data. Examples of access data stored in access log 160 are described above. The user interaction module 302 repeatedly receives feedback regarding the user's interactions with various videos and updates the access data for the user based on the received feedback.

The interaction strength module 304 analyzes the access data for a user and determines an interaction strength $IS_i$ indicating a user's degree of association with a particular video $v_i$. To determine the IS value, the interaction strength module 304 assigns different weights to different types of user's interactions with the video. For example, a user starting a video may be assigned a weight of 0.5, a user watching at least 80% of the video may be assigned a weight of 0.75, a user giving a favorable rating for the video may be assigned a weight of 1.5, a user favoriting a video may be assigned a weight of 2.0, and a user subscribing to a channel of videos associated with the watched video or with the user who uploaded the watched video may be assigned a weight of 5.0. The interaction strength module 304 assigns greater weight to the user's interactions indicating a greater involvement with a video. For example, the interaction strength module 304 assigns a greater weight to a user adding a video to a playlist, or sharing a video with others, than to the user watching the video. Additionally, the interaction strength module 304 adjusts the weight for a particular interaction based on the frequency or duration of the interaction. For example, the interaction strength module 304 assign a greater weight to a user's view of a particular video if the user has viewed the video a number of times instead of just once or for a ten minute duration instead of thirty seconds. In one embodiment, the interaction strength module 304 normalizes the adjusted weights based on the total number of videos the user has interacted with, the total number of times the user has interacted with the videos, or the total amount of time the user has spent interacting with the videos.

The interaction strength module 304 assigns negative or relatively low weights to certain interactions indicating the user's lack of interest in a particular video. For example, skipping a presented video, flagging a video, or blocking a video from a playlist may be assigned a negative weight.

In one embodiment, the interaction strength module 304 discounts the weight based on their age. For example, the interaction strength module 304 exponentially decays the weight associated with a user interaction based on the amount of time elapsed since the user interaction occurred. Accordingly, a user interaction that occurred recently is assigned a higher weight than a user interaction that occurred at an earlier time.

After assigning and adjusting weights for the user's interactions with a particular video, the interaction strength module 304 determines and stores an interaction strength IS indicating the strength of the user's interactions or association with the video. The interaction strength is based on the assigned and adjusted weights. For example, the interaction strength is a sum or product of the assigned and adjusted weights.

As described above, the user analysis module 120 determines for a user, the videos $v_i$ the user has interacted with (from the user access log 160) and the user's interaction strength $IS_i$ for each of these videos (determined by the interaction strength module 304). Also, as described above, the user analysis module 120 determines for each of these videos $v_i$, topics t associated with the video (from the video database 155) and, for each of the associated topic $t_k$, a topic strength $TS_k$ indicating the topic's degree of association with the video (from the video database 155).

Based on this information, the user profile module 306 determines a set T of topics for a user's profile. To determine the topics T for a user profile, the user profile module 306 sorts the videos $v_i$ the user interacted with based on the topics $t_k$ associated with the videos. The sort results in sets $S=\{s_1, s_2, s_3 \ldots s_j\}$ of topics such that each set $s_j$ includes a topic $t_k$ and its associated user's videos $v_{i,k}$. The user profile module 306 selects a number of the topic sets s, where each selected set has a minimum number of videos, e.g., each selected topic set has at least 20 videos. The topics $t_k$ of the selected sets s form the set T topics for the user's profile.

Alternatively, the user profile module 306 determines the set T of topics for a user profile based on a topic association strength TAS determined for each set s, where $TAS_j$ indicates the degree of association between set $s_j$'s topics t and the user. To determine the topic association strength $TAS_j$ for a particular set $s_j$ of topics $t_k$, the user profile module 306 combines the topic strengths $TS_k$ of the set's topics $t_k$ for each of the videos $v_i$ in the set $s_j$. Combining the topic strengths TSs may occur by adding, averaging, or applying another arithmetic or statistical function to the topic strengths TSs. After determining the topic association strength $TAS_j$ for each set $s_j$ in S, the user profile module 306 selects a number of these sets based on the sets topic association strengths $TAS_j$. For example, the user association module 306 may select fifty sets s with fifty highest topic association strengths TAS. The topics $t_k$ of the selected sets s form the set T topics for the user's profile.

The user profile module 306 also stores in the user's profile the topic association strengths TAS associated with the stored topics. The user profile module 306 can be configured to periodically updates the stored topics in a user's profile using the process described above, based on the videos that the user interacted with since a prior update.

Additionally, in one embodiment, the user profile module 306 receives topics that are related with the topics stored in a user profile and stores the related topics in the user profile. The user profile module 306 receives the related topics from the related topics module 308. Related topics module 308 accesses the topics in a user's profile and determines additional topics related to the profile's topics.

There are several different ways that the related topics module 308 can determine related topics. These include a demographic approach, a topic co-occurrence approach, and a combined demographic and topic co-occurrence approach. Additional approaches to determine related topics would be apparent to one of ordinary skill in the art in light of the disclosure herein. For example, related topics may also be determined based on topics' relationships specified in a knowledge base like Freebase.

Related Topics Based on Demographics

In one embodiment, related topics module 308 determines related topics based on the popularity of various topics in each of a number of demographic groups. In this embodiment, the related topics module 308 organizes the user profiles in the profile corpus based on one or more demographic category, such as gender and age group. For example, the related topics module 308 can organize the user profiles into twelve demographic groups $D_z$ of profiles based on the user's gender (male, female) and age group (e.g., 13-17, 18-24, 25-34, 35-44, 45-54; 55+). The related topics module 308 then determines, for each demographic group $D_z$ of user profiles, a number of most frequently occurring topics t (e.g., the top 50 most frequently occurring topics); this forms the related topic set $R_z$ for the demographic group $D_z$. Then for a given demographic group $D_z$, the related topics module 308 adds the related topics $R_z$ to each user profile in $D_z$. If a topic t in $R_z$ is already present in the user profile, then it can be handled either by skipping it, or by increasing its topic association strength TAS.

Related Topics Based on Topic Co-Occurrence

In another embodiment, the related topics module 308 uses the co-occurrence of topics in the user profiles to determine which topics are related to each other. To determine the related topics, the related topics module 308 initially determines, across a collection of user profiles (e.g., all user profiles in the system), pairs of topics ($t_i$, $t_j$) that co-occur in at least some of the user profiles in the collection, and from there determines a measure of co-occurrence for each topic pair. The determination of these co-occurring topics is described in regards to FIG. 5 below. The related topics module 308 then determines for each topic $t_k$ in the corpus, the most closely related topics $t_1$ based on the co-occurrence measure. Next, given a user profile with topics $t_j$, the related topics module 308 adds to the user profile for each topic $t_j$ the most closely related topics $t_1$.

Figure 5:
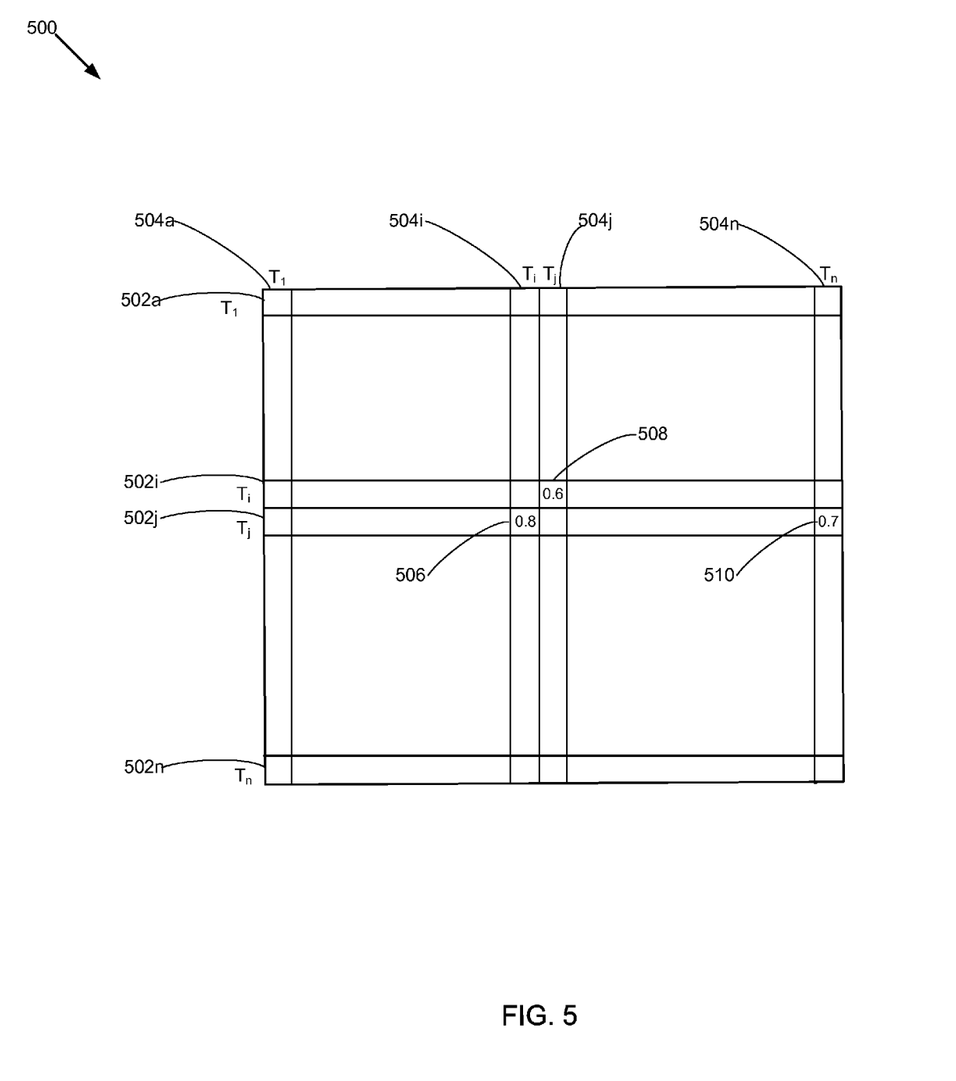
FIG. 5 illustrates a co-occurrence matrix that stores co-occurrence strengths indicating the measure of co-occurrence of a first topic with another topic according to one embodiment.

FIG. 5 illustrates a co-occurrence matrix 500 that stores co-occurrence strengths $CS_{i,j}$ indicating the measure of co-occurrence of a topic $t_i$ with another topic $t_j$. One of ordinary skill in the art will understand that the illustrated co-occurrence matrix 500 is simply a graphical representation of co-occurrence strengths CSs used to aid the description of the related topics module 308, and that the matrix 500 may be stored in various data structures like arrays, lists etc. Given n topics t, the co-occurrence matrix 500 is an nXn matrix. Each row 502a-n represents a topic $t_i$ and each column 504a-n represents a topic $t_j$. Each cell, like cell 508 represents the co-occurrence strength $CS_{i,j}$ of for the pair of topics $t_i$ and $t_j$.

The co-occurrence strength $CS_{i,j}$ for the pair of topics $t_i$ and $t_j$ may be determined as follows. As noted above, each topic $t_i$ in user profile has a topic association strength $TAS_i$. Thus, for a pair of topics $t_i$ and $t_j$ co-occurring in a given user profile, the related topics module 308 computes a profile co-occurrence strength $PCS_{i,j}$ based on the topic association strengths $TAS_i$ and $TAS_j$. The profile co-occurrence strength $PCS_{i,j}$ may be a product, sum, average, or another arithmetic or statistical function of the pair's topic association strengths $TAS_i$ and $TAS_j$. The co-occurrence strength $CS_{i,j}$ is then the combined $PCS_{i,j}$ summed across all user profiles in which topics $t_i$ and $t_j$ co-occur. Each $PCS_{i,j}$ is then normalized by the frequency of topic $t_i$ in the profile corpus. In other embodiments, combining may include averaging, adding, or performing another arithmetic or statistical function on the profile co-occurrence strengths PCS.

An example illustrated in FIG. 5 assists in describing the method for computing the co-occurrence strengths (CSs). In FIG. 5, cell 508 includes the co-occurrence strength (CS) for topic $T_i$ (topic for intersecting row 502i) co-occurring with topic $T_j$ (topic for intersecting column 504j) in the profile corpus used to select topics for the co-occurrence matrix 500. This co-occurrence strength (CS) is a normalized sum of topic association strengths (TASs) of $T_i$ and $T_j$ for corpus' profiles that include both these topics. The sum of the topic association strengths (TASs) has been normalized by the frequency of $T_i$'s appearance in corpus' profiles. Similarly, cell 506 includes the co-occurrence strength (CS) for topic $T_j$ co-occurring with topic $T_j$. This co-occurrence strength (CS) is also a normalized sum of topic association strengths (TASs) of $T_i$ and $T_j$, but this sum has been normalized by the frequency of $T_j$'s, not $T_i$'s, appearance in the corpus' profiles.

After populating the co-occurrence matrix 500, the related topics module 308 identifies for each topic $t_i$ (by row) a number of cells with the highest co-occurrence strengths CSs (e.g., 50 highest values), or the cells with co-occurrence strengths CS beyond a threshold value (e.g., $CS_{i,j}$>75% of maximum $CS_{i,j}$). These cells represent the set of topics $R_i$ that are determined to be related to topic $t_i$.

The example illustrated in FIG. 5 further illustrates the method employed by the related topics module 308 to select related topics for topic $T_j$. In FIG. 5, assume that cells 508, 510 include the highest co-occurrence strengths $CS_{i,j}$ for topic $t_j$ (represented by row 502j). The related topics module 308 identifies these cells 506, 508 as the cells with the highest co-occurrence strengths $CS_{i,j}$ and thus identifies topics $t_i$ and $t_n$ (the topics of the intersecting columns 504i, 504n for cells 506, 508) as topics related to topic $t_j$.

Finally, given a user profile of topics t, for each topic $t_i$ therein the related profile module 308 adds the related topics $R_j$ to the user profile. If a topic t in $R_i$ is already present in the user profile, then it can be handled either by skipping it, or by increasing its topic association strength TAS.

Related Topics Based on Demographics and Co-Occurrence

In one embodiment, the related topics module 308 determines related topics for a selected user from a profile corpus of users that are in same demographic group as the selected user. To determine these related topics, the related topics module 308 constructs for each demographic group $D_z$ a co-occurrence matrix 500 from a set of user profiles belonging to that group. Then for each demographic group $D_z$, the related topics module 308 determines the related topics $R_{z,i}$ for each topic, in that that group's co-occurrence matrix.

User Selected Topics

Figure 4:
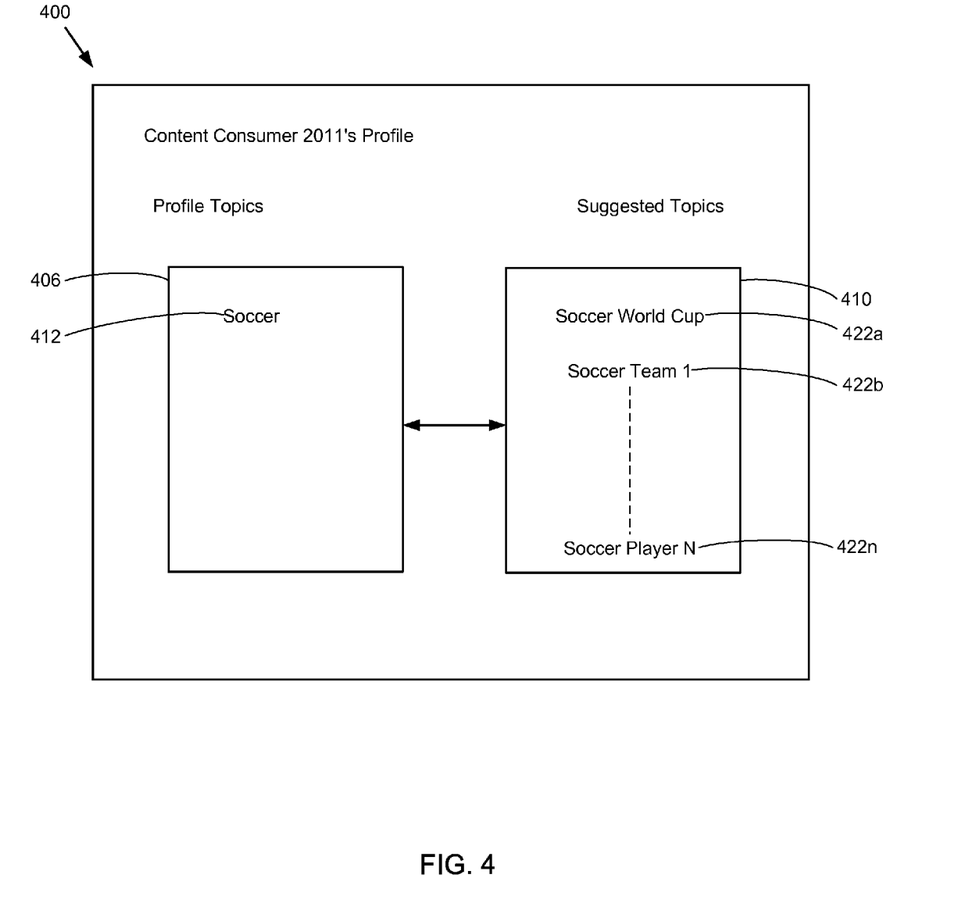
FIG. 4 is a screen illustrating an interface for receiving users' areas of interests for storage in their profiles according to one embodiment.

In the foregoing embodiments, the related topics module 308 automatically adds related topics to each user's profile. Alternatively, the related topics module 308 can be configured to enable users to selectively add related topics to their individual user profiles. In one embodiment, the users may add topics, including related topics, to their own profiles through an interface such as the one illustrated in FIG. 4. The interface in FIG. 4 includes a profile topics column 406 and a related topics column 410. The profile topics column 406 includes the topics 412 associated with a user's profile based on the analysis of the user's interactions with videos. In response to a user selecting one or more of the topics 412 in the profile topics column 406, the related topics column 410 is updated to include topics 422a-n related to the selected topics 412. The related topics 422a-n are determined by the related topics module 308 and presented to the user in the related topics column 410. The user may select one or more related topics 422a-n, and in response to such selection, these topics are added to the user's profiles. In one embodiment, the user profile module 306 also determines and stores with the additional topics their topic association strengths TASs.

Personal Content Streams

Figure 6:
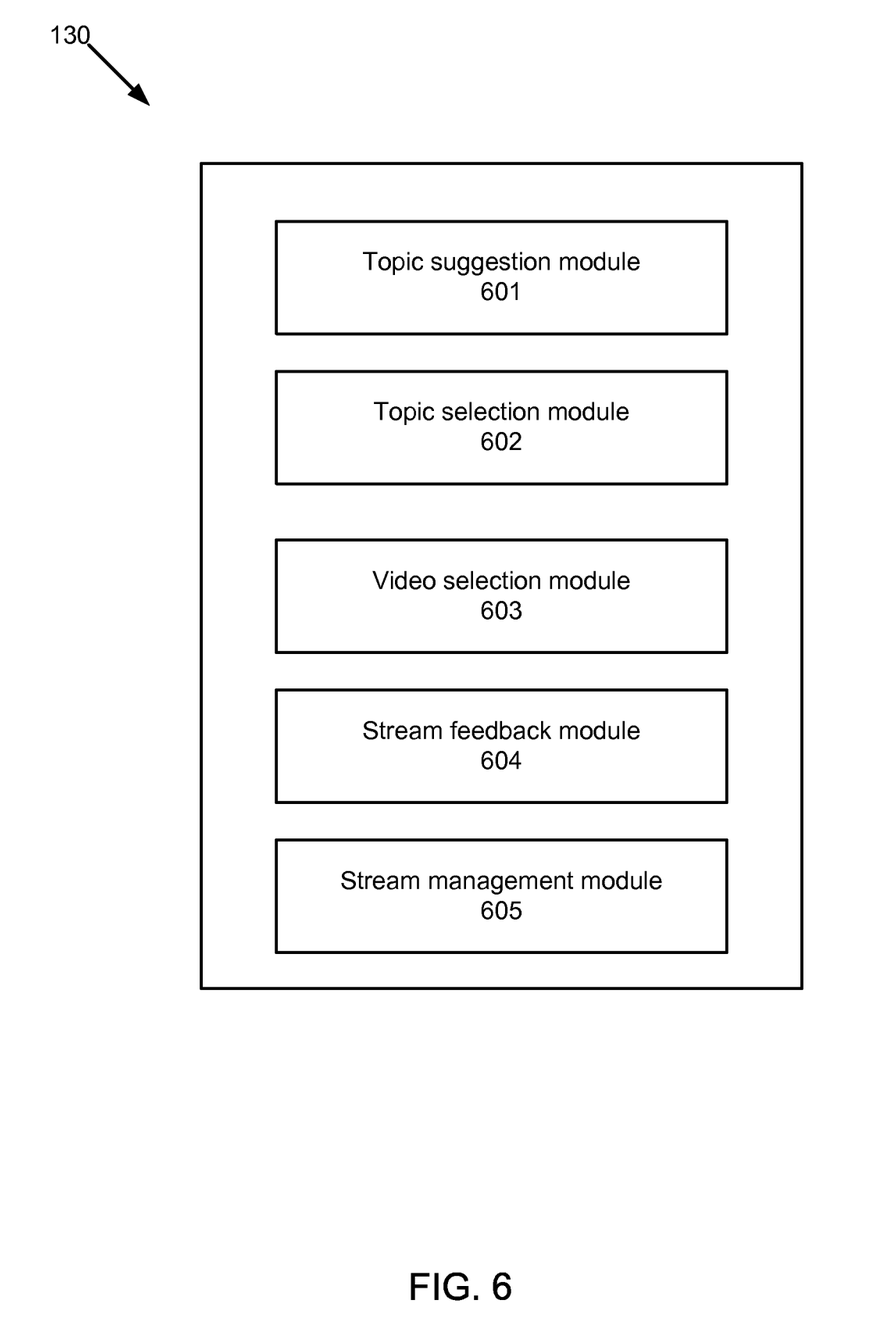
FIG. 6 is a block diagram illustrating the personal content stream module that generates topics and videos associated with a personal content stream according to one embodiment.

FIG. 6 is a block diagram illustrating the personal content stream module 130 according to one embodiment. The personal content stream module 130 comprises a topic suggestion module 601, a topic selection module 602, a video selection module 603, a stream feedback module 604, and a stream management module 605.

As described above, each video $v_k$ is associated with one or more topics according to a topic strength $TS_{i,k}$. Thus, for each topic $t_i$ there is set $V_i$ of videos, which can be ordered according to their respective topic association strength $TS_{i,k}$. Similarly, each user is associated with one or more topics $t_j$, according to topic association strength $TAS_j$.

A personal content stream comprises a plurality of videos of interest to the user, where the videos are selected from the video sets $V_i$ associated with one or more topics $t_i$, based upon the relationship between the topics $t_i$ and topics $t_p$ in the user's profile. The plurality of videos in a user's personal content stream are played automatically in succession to allow continuous viewing by the user with minimal interaction. The plurality of videos in the personal content stream may be added to, reordered, or otherwise modified while the user views videos from the personal content stream. A personal content streams is occasionally referenced herein as a stream S; a user can have one or more personal content streams S.

The topic suggestion module 601 aids identification of topics used to generate a personal content stream for the user, based on co-occurrence strengths, topic strengths, and topic association strengths, and is one means for performing this function. Given a user identification of a user, and thus the user profile for this user, the topic suggestion module 601 is configured to select a plurality of topics for use in a personal content stream for the user. The set of topics in the personal content stream are identified as set $T_s$, and individual topics there are identified as $t_s$. The topic suggestion module 601 is configured to select a topic $t_s$ for addition to a stream's set of topics $T_s$ in various different manners, as next described.

The module 601 can select a topic $t_s$ that has a topic association strength TAS with topics $t_p$ in the user profile exceeding a threshold. Alternatively, or in addition thereto, the module 601 given a topic $t_p$ in the user profile, the topic suggestion module 601 may provide a plurality of topics t, with co-occurrence strengths above a threshold. When providing suggested topics, both co-occurrence strength and topic association strength may be taken into account.

The topic selection module 602 is configured to enable the user to identify the set of topics $T_s$ ("stream topics") used in a personal content stream S for the user, and is one means for performing this function. The topic selection module 602 displays a topic selection user interface to the user and retrieves suggested topics from the topic suggestion module 601. In one embodiment, a default personal content stream $S_{default}$ may be populated through a request to the topic suggestion module 601 for topics $t_p$ in the user profile or a proper subset of topics $t_p$. When added to a set of topics $T_s$, each individual topic $t_s$ is assigned a stream topic strength STS representing a user's degree of association with a topic $t_s$ for a given stream. A stream topic strength STS differs from a topic association strength by being applicable for only a certain stream. Thus, different streams may have varying stream topic strengths associated with the same topic included in their respective sets of topics $T_s$. In one embodiment, the STS associated with a topic added to a set of stream topics $T_s$ is initially set to a default value. The STS for a topic may also be initially set to match the topic association strength TAS associated with the topic. The set of topics may be normalized after a topic has been added.

Alternatively, a plurality of user topic subsets may be generated from topics $t_p$. Each of the user topic subsets comprises a cluster of topics from user profile topics $t_p$ with a co-occurrence strength exceeding threshold. A topic in $t_p$ with a high topic association strength TAS may be selected as a cluster seed. The topic selection module 602 then displays each of the plurality of user topic subsets to the user for selection. The topic selection module 602 receives input from the user selecting one of the plurality of user topic subsets.

Figure 8:
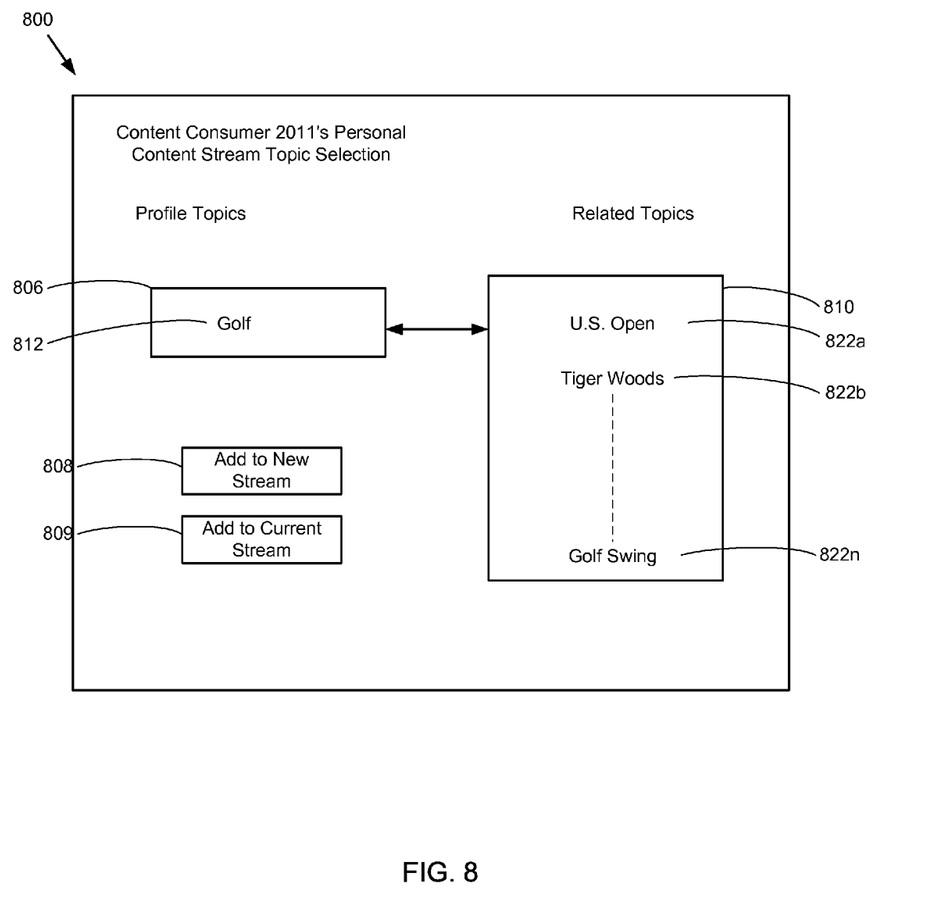
FIG. 8 is a screen illustrating an interface for receiving users' topics of interest for generating a personal content stream.

Another method of identifying the topics $t_s$ for $T_s$ involves an interface allowing the user to add topics as illustrated in FIG. 8. The interface in FIG. 8 includes a topic input box 806 and a related topics column 810. The topic input box 806 receives input from the user identifying a topic stored in the topic repository 168. The topic input box 806 can be coupled to an auto-complete function that identifies topics matching the input letters and can suggest the matching topic having the highest topic association strength TAS. The user can select a suggested topic at any time. In response to a user identifying a topic in the topic input box 806, the related topics column 810 is updated to include topics 822a-n related to the identified topic by a co-occurrence strength exceeding a threshold. The related topics 822a-n may be determined by the related topics module 308 and presented to the user in the related topics column 810. The user may select the topic identified in the topic input box 806 or any of the topics displayed in the related topics column 810. A selected topic is be added to a stream by selecting the add to new stream control 808 or the add to current stream control 809. Optionally, the topic input box 806 can be replaced by a list of topics included in a user's profile. Referring again to FIG. 6, after the user has identified the stream topics $t_s$ for $T_s$, the topic selection module 602 may optionally expand the plurality of stream topics $T_s$ to include additional related topics in order to add to the amount and variety of videos that may be included in the personal content stream. Accordingly, any discussion herein of the topics $t_s$ in $T_s$ should be understood to optionally include related topics, without further recitation thereof. In one embodiment, related topics generated by topic selection module 602 are given a lesser weighting than that of user identified topics. Using the expanded plurality of topics with weighted values, a plurality of stream videos is generated using stored topic strength for each of the stream topics.

A video selection module 603 identifies videos to be included in a user's personal content stream, given the set of stream topics $T_s$, and is one means for performing this function. The video selection module 603 selects videos using the topic strengths $TS_s$ of the respective stream topics $t_s$ and the stream topic strengths $STS_{s,i}$ of the topics $t_s$.

In one embodiment, video selection module 603 randomly selects a topic $t_s$ from set of stream topics $T_s$, based on the stream topic strengths $STS_s$, using a probability mass function. That is, the probability of selection for a given topic $t_s$ is equal to that topic's stream topic strength $STS_s$.

Once a topic $t_s$ is selected, the video selection module 603 then selects a video $v_k$ from the set $V_s$ of videos associated with the selected topic $t_s$ using their topic strengths $TS_{s,k}$. In one embodiment, the videos are selected in order of their topic strengths $TS_{s,k}$, starting with the video with the highest TS. Alternatively, the videos can be selected using a probability mass function using their respective TS values.

The above selection process is repeated to select a plurality of videos $v_s$ for the personal content stream S. Various heuristics may be used to further control the selection process. First, if a selected video for a selected topic was recently played for the user, then either another video in the same topic is selected, or a video is then selected from another topic $t_s$ in $T_s$. Similarly, if a topic was recently used to select a video for playback in the personal content stream, a new topic may be selected.

Using Feedback with Personal Content Streams

A stream feedback module 604 modifies the stream topic strengths STS associated with the topics $t_s$ in the set of stream topics $T_s$ based on user interaction. Both implicit and explicit input feedback may be used to modify the stream topic strength STS of topics in the stream topics $T_s$, as well as of topics $t_p$ in the user profile. Explicit feedback is input from the user primarily for the purpose of indicating a positive or negative reaction to a video. Implicit positive or negative feedback can be inferred from user inputs, though the inputs themselves may have a different primary function. For example, explicit input from the user may include liking, disliking, sharing or favoriting a video. Implicit input may include skipping a video or watching a significant portion of a video. For positive interactions with a video, the stream topic strengths STS of each topic associated with the video are increased. For negative interactions with a video, the stream topic strengths STS of each topic associated with the video are decreased by the stream feedback module 604. Different interactions may cause the stream topic strengths STS of a topic to be changed by a different amount. After adjusting topic weights, the topic association strengths TAS of each stream topic $t_s$ may be re-normalized. In one embodiment, stream feedback module 604 transmits received feedback to the interaction strength module 304 and receives the appropriate weight for updating the STS of each topic in $t_s$ associated with a video.

During viewing of a personal content stream, topics may be added or removed from the stream topics $T_s$ based on user feedback. This may be done periodically after a certain amount of time or videos viewed, and may also be done whenever a topic's stream topic strength STS or co-occurrence strength falls outside respective high and/or low thresholds. If a topic not currently in $T_s$ has a co-occurrence strength above a high threshold with one or more topics in $T_s$, stream feedback module 604 may add the topic to the stream topics $T_s$. Similarly, if a topic currently in $T_s$ has a stream topic strength STS below a low boundary threshold, stream feedback module 604 may remove the topic from the stream topic set $T_s$. Co-occurrence strength may also be taken into account or removing topics from $T_s$.

In one embodiment, if a friend, or other user associated with the user of the stream S, gives a video a favorable rating (e.g. liked the video using a FACEBOOK™ account or +1'd a video using a GOOGLE+™ account), the video is added to the plurality of videos $v_s$ for the personal content stream S. In addition, the topics associated with the video given a favorable rating may be added to the plurality of stream topics $T_s$ or their associated stream topic strengths STSs may be modified.

Stream management module 605 is configured to allow the user to customize a personal content stream, and is one means for performing this function. In one embodiment, the stream management module 605 is configured to save a user's a personal content stream S and its associated set of stream topics $T_s$ with the user's account information for a user's later interaction with the video hosting service 100. Saving the personal content stream S may be done explicitly by the user or automatically upon creating, updating or leaving the personal content stream. Stream management module 605 is further configured to allow the user to delete a personal content stream, modify the topics associated with a personal channel and where a personal content stream is to be displayed. The stream management module 605 is further configured to transmit information describing a user's a personal content stream to a specified handheld device, settop box, or other compatible device separate from the client used to access the stream management features.

In one embodiment, a personal content stream can be identified as a private content stream accessible only to the particular user, or as a public content stream that may be shared with, and accessed by other users, so that such users view the videos for such personal content stream. In one embodiment, replay tolerance may also be adjusted for a certain personal content stream or all personal content streams. Replay tolerance is a metric that controls how often a video or videos from the same topic should be replayed.

The user may also be allowed to explicitly block a topic from appearing in a certain personal content stream. For example, a motorcycle topic may be blocked from a personal content stream featuring a vehicle topic. In one embodiment, only user selected topics for a personal content stream are displayed to the user for modification. Stream management module 605 may allow the user to choose to view topics that were added as part of the plurality of topics for modification.

In one embodiment, the stream management module 605 is configured to display a list of upcoming videos for playback in a personal content stream to the user. Stream management module 605 can be configured to allow the user to adjust the number of videos displayed as part of the plurality of upcoming videos. The stream management module 605 may be configured to disable the use of user feedback by stream feedback module 604 for modifying the plurality of upcoming videos.

In one embodiment, the videos that have been played as part of a personal content stream may be saved as a playlist for later viewing. This enables the user to select for viewing a very specific set of videos which is unlikely to be reproduced due to the randomized generation of personal content stream videos.

Figure 7:
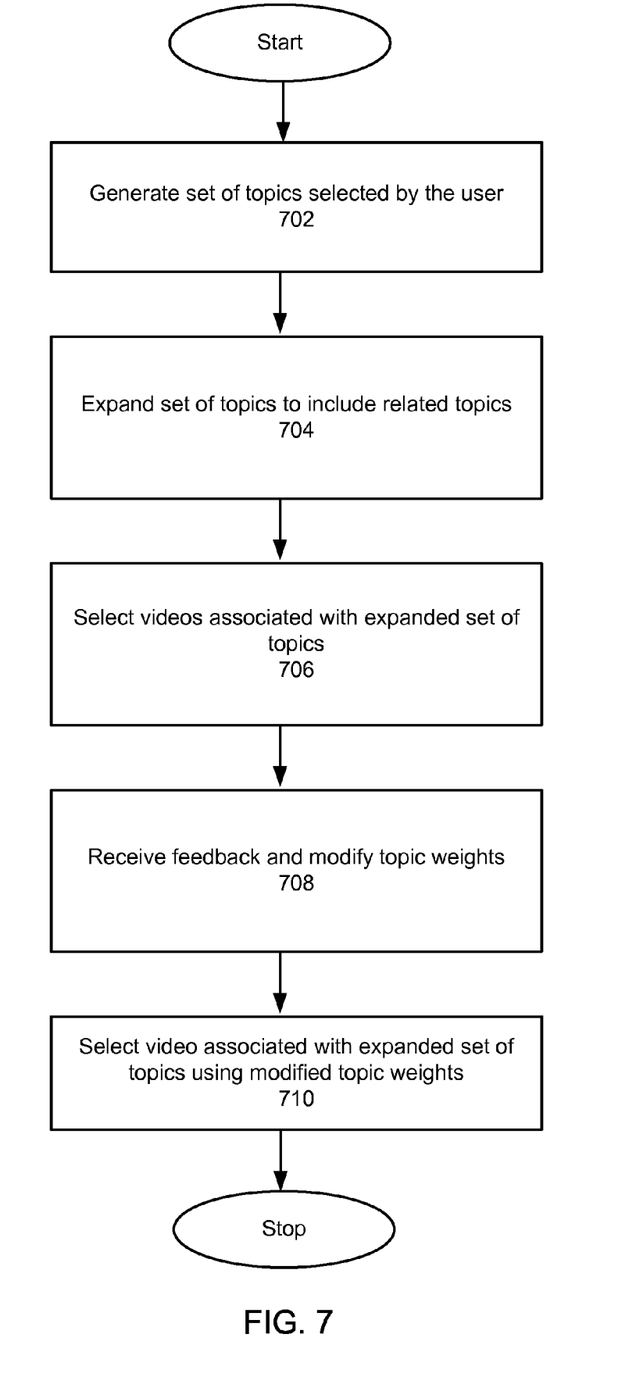
FIG. 7 illustrates a method executed by the personal content stream module for generating and modifying personal content streams.

FIG. 7 illustrates a method executed by the personal content stream module 130 for generating and modifying personal content streams. To generate 702 a plurality of topics selected by the user, the topic selection module 602 receives a topic identification from the user at the topic input box 608 and provides related topics for inclusion in the stream topics $T_s$. The video selection module 603 optionally expands 704 the plurality of topics to include topics related to the user identified topics. Videos are selected 706 by the video selection module 603 that are associated with one or more of the topics $t_s$ for inclusion in a plurality of stream videos.

The stream feedback module 604 receives feedback from the user and modifies 708 the stream topic strengths STS associated with each of the topics in set $T_s$ of stream topics. The video selection module 603 selects 710 a video to be added to the plurality of stream videos from videos associated with the stream topics $T_s$ using stream topic strengths STS modified according to received user feedback and co-occurrence strengths.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for generating a personal content stream of videos, the method comprising:

accessing a profile of a user, the profile having a plurality of topics;

generating a plurality of sets of stream topics for a personal content stream for the user based on the plurality of topics in the user profile, each set of stream topics including a plurality of stream topics and wherein at least one stream topic from the plurality of sets of stream topics is selected using a probability mass function;

providing the plurality of sets of stream topics to a client device of the user for display on the client device;

receiving, from the client device, a user selection of a set of stream topics from the plurality of sets of stream topics as a basis for the personal content stream for the user;

selecting a plurality of videos for inclusion in the personal content stream for the user, each selected video associated with a stream topic included in the set of stream topics selected by the user; and providing the personal content stream including the selected plurality of videos as a continuous series of videos played back automatically to the user.

2. The computer-implemented method of claim 1, wherein responsive to determining that a selected video from the plurality of videos has been previously played back to the user, selecting another video to include in the personal content.

3. The computer-implemented method of claim 2, wherein selecting another video comprises selecting a video associated with a same stream topic in the set of stream topics that is associated with the previously played video.

4. The computer-implemented method of claim 2, wherein selecting another video comprises selecting a video associated with a stream topic in the set of stream topics that is different from a stream topic associated with the previously played video.

5. The computer-implemented method of claim 1, wherein generating the plurality of sets of stream topics comprises selecting a set of profile topics from the user profile and selecting expanded topics associated with the set of profile topics, the plurality of sets of stream topics including the set of profile topics and the expanded topics.

6. The computer-implemented method of claim 1, wherein selecting the plurality of videos comprises selecting a video with a highest video-topic association value.

7. A computer system for generating a personal content stream of videos, the system comprising a non-transitory computer readable medium storing instructions for:
 accessing a profile of a user, the profile having a plurality of topics;
 generating a plurality of sets of stream topics for a personal content stream for the user based on the plurality of topics in the user profile, each set of stream topics including a plurality of stream topics and wherein at least one stream topic from the plurality of sets of stream topics is selected using a probability mass function;
 providing the plurality of sets of stream topics to a client device of the user for display on the client device;
 receiving, from the client device, a user selection of a set of stream topics from the plurality of sets of stream topics as a basis for the personal content stream for the user;
 selecting a plurality of videos for inclusion in the personal content stream for the user, each selected video associated with a stream topic included in the set of stream topics selected by the user; and
 providing the personal content stream including the selected plurality of videos as a continuous series of videos played back automatically to the user.

8. The computer system of claim 7, wherein responsive to determining that a selected video from the plurality of videos has been previously played back to the user, selecting another video to include in the personal content stream.

9. The computer system of claim 8, wherein selecting another video comprises selecting a video associated with a same stream topic in the set of stream topics that is associated with the previously played video.

10. The computer system of claim 8, wherein selecting another video comprises selecting a video associated with a stream topic in the set of stream topics that is different from a stream topic associated with the previously played video.

11. The computer system of claim 7, wherein generating the plurality of sets of stream topics comprises selecting a set of profile topics from the user profile and selecting expanded topics associated with the set of profile topics, the plurality of sets of stream topics including the set of profile topics and the expanded topics.

12. The computer system of claim 7, wherein selecting the plurality of videos comprises selecting a video with a highest video-topic association value.

13. A computer program product comprising a non-transitory computer-readable storage medium storing executable code for generating a personal content stream of videos, the code when executed performs steps comprising:
 accessing a profile of a user, the profile having a plurality of topics;
 generating a plurality of sets stream topics for a personal content stream for the user based on the plurality of topics in the user profile, each set of stream topics including a plurality of stream topics and wherein at least one stream topic from the plurality of sets of stream topics is selected using a probability mass function;
 providing the plurality of sets of stream topics to a client device of the user for display on the client device;
 receiving, from the client device, a user selection of a set of stream topics from the plurality of sets of stream topics as a basis for the personal content stream for the user;
 selecting a plurality of videos for inclusion in the personal content stream for the user, each selected video associated with a stream topic included in the set of stream topics selected by the user; and
 providing the personal content stream including the selected plurality of videos as a continuous series of videos played back automatically to the user.

* * * * *